United States Patent
Li

(10) Patent No.: US 6,748,386 B1
(45) Date of Patent: Jun. 8, 2004

(54) SYSTEM AND METHOD FOR AUTOMATED CONSTRUCTION OF URL, COOKIE, AND DATABASE QUERY MAPPING

(75) Inventor: Wen-Syan Li, Fremont, CA (US)

(73) Assignee: NEC Corporation, Tokyo (JP)

( * ) Notice: Subject to any disclaimer, the term of this patent is extended or adjusted under 35 U.S.C. 154(b) by 433 days.

(21) Appl. No.: 09/851,709

(22) Filed: May 8, 2001

Related U.S. Application Data

(60) Provisional application No. 60/285,972, filed on Apr. 24, 2001.

(51) Int. Cl.$^7$ .............................................. G06F 17/30
(52) U.S. Cl. ...................... 707/10; 707/104.1; 709/238; 709/239
(58) Field of Search .................... 707/1–10, 100–104.1; 715/500.1, 501.1; 709/201, 203, 238, 239

(56) References Cited

U.S. PATENT DOCUMENTS

| | | | |
|---|---|---|---|
| 6,038,598 A | * | 3/2000 | Danneels ...................... 709/219 |
| 6,098,093 A | * | 8/2000 | Bayeh et al. ................. 709/203 |
| 6,185,614 B1 | * | 2/2001 | Cuomo et al. ............... 709/224 |
| 6,247,044 B1 | * | 6/2001 | Gosling et al. .............. 709/203 |
| 6,298,356 B1 | * | 10/2001 | Jawahar et al. .............. 707/201 |
| 6,405,241 B2 | * | 6/2002 | Gosling et al. .............. 709/203 |
| 6,591,266 B1 | * | 7/2003 | Li et al. ........................ 707/10 |
| 6,604,106 B1 | * | 8/2003 | Bodin et al. ................. 707/101 |
| 2002/0129149 A1 | * | 9/2002 | Schulz ......................... 709/226 |

\* cited by examiner

*Primary Examiner*—Greta Robinson
*Assistant Examiner*—Linh Black
(74) *Attorney, Agent, or Firm*—Foley & Lardner LLP

(57) ABSTRACT

A method for constructing a URL, cookie, and database query mapping is disclosed. The method is employed within a content delivery system comprising a Web server, an application server and a database management system (DBMS), wherein the Web server is coupled for receiving a URL request destined for an original servlet in the Web server. The method comprises redirecting the URL request to a wrapper servlet, which includes statements for extracting the URL string and cookie information, and assigning a job identification system variable containing the URL string and cookie information to the redirected URL request. The redirected URL request is then forwarded to the original servlet in the form of an HttpServletRequest. The HttpServletRequest is then communicated to the application server, which issues at least one query destined for an original database connection API the DBMS. The at least one query includes the job identification system. The query is then redirected to a wrapper database connection API within the DBMS, which includes statements for recovering the URL string and cookie information from the at least one query and constructing a URL, cookie, and database query mapping.

30 Claims, 3 Drawing Sheets

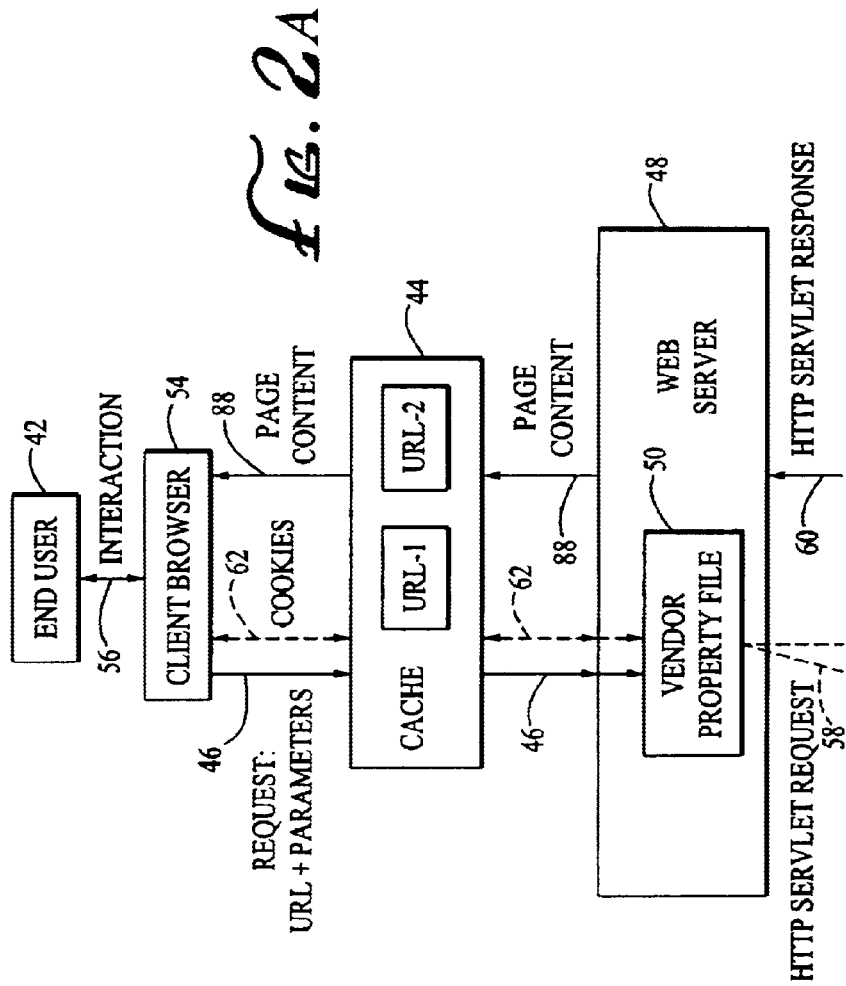

SYSTEM AND METHOD FOR AUTOMATED CONSTRUCTION OF URL, COOKIE, AND DATABASE QUERY MAPPING

CROSS-REFERENCE TO RELATED APPLICATIONS

Embodiments of the present invention claim priority from U.S. Provisional Patent Application Serial No. 60/285,972 entitled "Automated Construction of URL, Cookie, and Database Query Mapping," filed Apr. 24, 2001, and are related to U.S. Utility Patent now U.S. Pat. No. 6,591,266 entitled "System and Method for Intelligent Caching and Refresh of Dynamically Generated and Static Web Contents," filed Aug. 14, 2000. The content of these applications is incorporated by reference herein.

BACKGROUND OF THE INVENTION

1. Field of the Invention

The present invention relates, generally, to content delivery systems, and, in preferred embodiments, to the automated construction of URL, cookie, and database query mappings in systems and methods for intelligent caching and refreshing of dynamically generated and static web content.

2. Description of the Related Art

The need to account for users' quality perceptions in designing Web servers for e-commerce systems has been well recognized, for the brand name of an e-commerce site is often associated with the type of experience users receive. Response time is a key point of differentiation among e-commerce Web sites. Snafus and slow-downs at major Web sites during special events or peak times demonstrate the difficulty of scaling up e-commerce sites. Such slow response times and down times can be devastating for e-commerce sites as indicated in a recent study on the relationship between Web page download time and user abandonment rate. The study shows that only 2% of users will leave a Web site (i.e. abandonment rate) if the download time is less than 7 seconds. However, the abandonment rate jumps to 30% if the download time is around 8 seconds. The abandonment rate goes up to 70% when the download time is around 12 seconds. This study clearly establishes the importance of fast response times to an e-commerce Web site to retain its customers.

In technical terms, to ensure the fast delivery of fresh dynamic content and engineer highly scalable e-commerce Web sites for special events or peak times puts heavy pressure on IT staffs due to the complexity of current e-commerce applications. For many e-commerce applications, Web pages are created dynamically based on the current state of a business, such as product prices, inventory, and other information stored in database systems. This characteristic requires e-commerce Web sites to deploy cache servers, Web servers, application servers, and database systems at the backend. The roles played by these servers are illustrated in FIG. 1 and summarized as follows:

1. A database management system (DBMS) 10 or other external data sources 26 to store, maintain, and retrieve all necessary data and information to model a business.
2. An application server (AS) 12 that incorporates all the necessary rules and business logic to interpret the data and information stored in the database. AS 12 receives user requests 14 for HTML pages and cookies 40, and depending upon the nature of a request, may need to access the DBMS 10 or external data source 26 via queries 28 or external data requests 30 and retrieve database results 32 or file/network access results 34 to generate the dynamic components of the HTML page 22.
3. A Web server (WS) 16 which receives user requests 18 and cookies 36 from end users 20 and delivers the dynamically generated Web pages 24 back to the end users 20.
4. Cache servers (edge caches or frontend caches) (not shown in FIG. 1) to accelerate content delivery.

One possible solution to scale up database-driven e-commerce sites is to deploy network-wide caches so that a large fraction of requests can be served remotely rather than being served from the origin Web site. This solution has several advantages, including improved content delivery times and reduced traffic at the Web sites. Many content delivery network (CDN) vendors provide Web acceleration services, and studies have shown that CDN can have a significant performance impact. However, for many e-commerce applications, HTML pages are created dynamically based on the current state of a business, such as product prices and inventory, rather than static information. As a result, the time to live (TTL) for these dynamic pages can not be estimated in advance, and content delivery by most CDNs is typically limited to the handling of fairly static pages and streaming media rather than the full spectrum of dynamic content.

Because the application servers, databases, Web servers, and caches are independent components, there is no efficient mechanism to have database content changes reflected in the cached Web pages. To ensure the freshness of dynamic content in the caches, integration of the caches, Web servers, application servers, and back-end database systems is required. Ideally, when updates in the database are observed, the pages which are impacted by such changes should be identified and such pages in the cache should be invalidated or refreshed accordingly. However, the information required for such integration includes the knowledge of what database queries and/or other external/internal data source access were the result of a dynamic Web page request. In other words, a mapping between URL requests and queries is required, and this knowledge is missing in conventional dynamic content caching solutions. Thus, there is a need for the automated construction of URL, cookie, and database query mappings to enable the efficient invalidation or refreshing of cached web content.

Note that knowledge about dynamic content is distributed across three or more different servers, including the Web server, the application server, and the database management server. Consequently, it is not straightforward to create a mapping between the data and the corresponding Web pages automatically. Some approaches, for example, assume that such mappings are provided by system designers. In other systems, programmers must re-engineer the application server programs to use a set of specific APIs (Application Program Interfaces) to generate such mappings.

More recently, other systems and methods for the construction of URL, cookie, and database query mappings have been proposed. For example, in U.S. Utility Patent U.S. Pat. No. 6,591,266 entitled "System and Method for Intelligent Caching and Refresh of Dynamically Generated and Static Web Contents" ("the '208 application"), the embodiment of FIG. 3 in the '208 application does not require modification of application server program, but it does over-invalidate cached pages because it is not 100% accurate. The embodiments of FIGS. 5, 6, and 7 in the '208 application require modification of application server programs or database application programs to pass additional parameters, but they are 100% accurate. The values of the URL string and cookie must be explicitly passed to the JDBC (Java Database Connectivity) (i.e. the database connection API).

SUMMARY OF THE DISCLOSURE

Therefore, it is an advantage of embodiments of the present invention to provide a system and method for the construction of URL, cookie, and database query mappings in which the users do not need to manually specify such mappings, as in other systems.

It is a further advantage of embodiments of the present invention to provide a system and method for the construction of URL, cookie, and database query mappings in which the existing application server programs do not need to be changed. Company Web sites may be reluctant to have their mission-critical application server programs modified by content delivery service providers. In addition, the source code may not be provided by the application server vendor.

It is a further advantage of embodiments of the present invention to provide a system and method for the construction of URL, cookie, and database query mappings which do not result in the over- or under-invalidation or refreshing of cached Web content.

It is a further advantage of embodiments of the present invention to provide a system and method for the construction of URL, cookie, and database query mappings which are automated, and wherein the mapping is "plug and play" compatible in the software of the Web site architecture, without requiring re-booting, recompiling, etc.

It is a further advantage of embodiments of the present invention to provide a system and method for the construction of URL, cookie, and database query mappings which can be selectively applied to one or more servlets in an application server, or enabled/disabled on the fly, without otherwise disrupting the application server.

It is a further advantage of embodiments of the present invention to provide a system and method for the construction of URL, cookie, and database query mappings in systems in which the application server employs a multiple-threaded or multi-tasking operating system.

These and other advantages are accomplished according to a method employed within a content delivery system comprising a Web server and application server, wherein the Web server is coupled for receiving a user information request destined for an original servlet in the Web server. The user information request may comprise a URL request. The servlets are capable of calling one or more database applications, which includes databases and the databases of suitable DBMSs, or other programs or servlets. The method comprises redirecting the user information request to a wrapper servlet, which includes statements for extracting user information request identification information from the user information request, and assigning a job identification system variable containing the user information request identification information to the redirected user information request. The user information request identification information may include URL string and cookie information. The redirected user information request is then forwarded to the original servlet in the form of an HttpServletRequest.

The HttpServletRequest is then communicated to the application server, which issues at least one query destined for accessing a database application such as a database, an original database connectivity API in the DBMS, or other programs or servers. The at least one query includes the job identification system variable. The query is then redirected to a wrapper database connectivity API, which includes statements for recovering the user information request identification information from the at least one query and constructing a user information request identification information and query mapping. At any of the above-described steps, timestamp information may be captured for Web site profiling purposes.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Response time is one key point of differentiation among electronic commerce (e-commerce) Web sites. For many e-commerce sites, Web pages are created dynamically based on the current state of a business stored in database systems. Snafus and slow-downs during special events or peak times create challenges for engineering high performance database-driven e-commerce Web sites. One way to achieve this goal is through dynamic content caching. Caching has been viewed as an effective way to scale up Web sites.

To ensure the freshness of dynamic content in the caches, integration of the caches, Web servers, application servers, and back-end database systems is required. Ideally, when updates in the database are observed, the pages which are impacted by such changes should be identified and such pages in the cache should be invalidated or refreshed accordingly. However, the information required for such integration includes the knowledge of what database queries and/or other external/internal data source access were the result of a dynamic Web page request. In other words, a mapping between URL requests and queries is needed.

Thus, embodiments of the present invention provide for the automated construction of URL, cookie, and database query mappings to enable the efficient invalidation or refreshing of cached web content. It should be understood that although embodiments of the present invention are described herein primarily using Java-related terminology for purposes of illustration and explanation, the scope of the present invention is not so limited, and is applicable to other virtual machine and interpretive dynamic languages and environments, such as application servers based on CGI (Common Gateway Interface), which use scripts other than Java.

Figure 1:
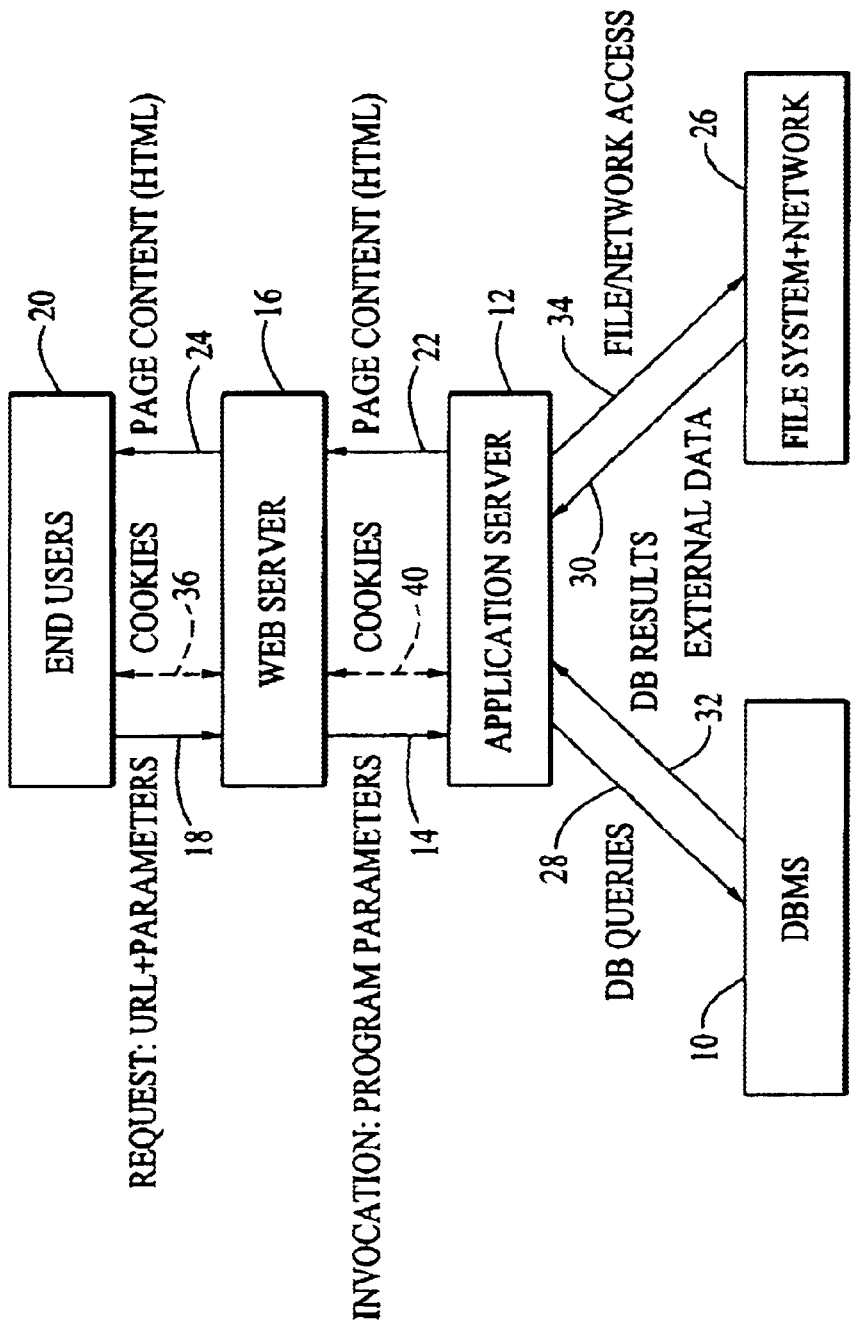
FIG. 1 is a block diagram illustrating an example of a conventional architecture and data flow of a database driven e-commerce Web site.
Figure 2B:
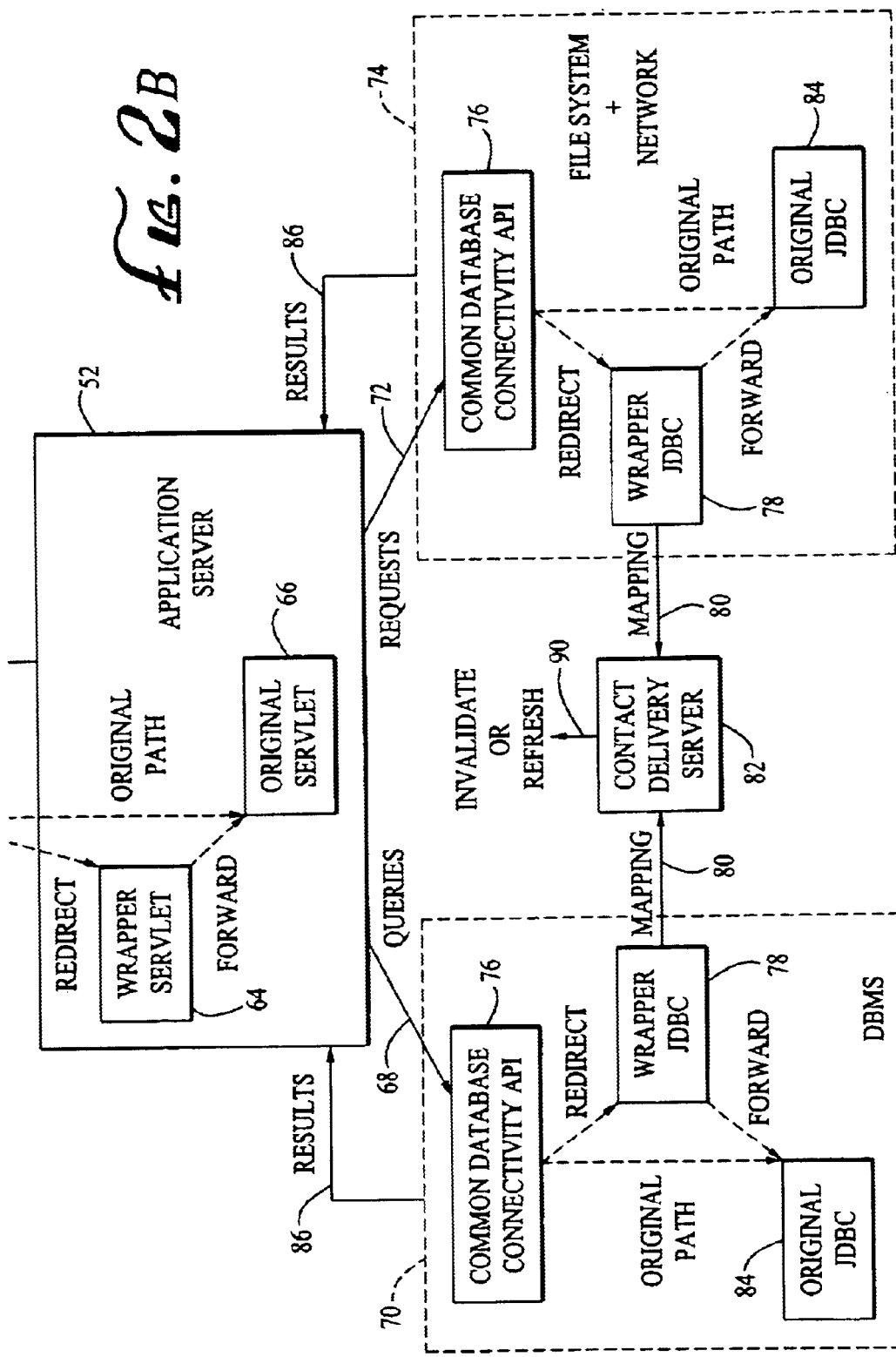
FIG. 2 is a block diagram illustrating an intelligent Web page caching and refreshing mechanism that automatically constructs a URL, cookie, and database query mapping according to an embodiment of the present invention.

A example system environment for embodiments of the present invention is illustrated in FIG. 2. As indicated in FIG. 2, if an end user 42, through interaction 56 with a client browser 54, makes a request 46 for a Web page that is not stored in cache 44, or is invalid in cache 44, the request 46 will be passed on to the Web server 48. Note that cookies 62 may also be passed to the cache 44 and the Web server 48 along with the request 46.

After the Web server 48 receives the request 46, it may send the request to the application server 52 along with some optional parameters. When the Web server 48 calls the application server 52, two classes (objects) may be used for communication between the Web server 48 and the application server 52. These objects may include an HttpServletRequest 58 for the communication of certain attributes (e.g., the URL request string and cookie information 62), and HttpServletResponse 60 for communicating the result returned by the application server 52. The cookie information 62 is essentially an additional key that may be necessary to identify the end user 42 and the specific Web page that should be delivered to the end user 42. The attribute values for the URL string and the cookie in HttpServletRequest 58 may then be extracted by the application server 52.

For example, Java statements to extract cookie information 62 may include the following:

```
Cookie[ ] cook=request.getCookies( );
for (int i=0;i<cook.length;i++){
String name=cook[i].getName( )
String value=cook[i].getValue( );
```

URL information and related necessary parameters can be extracted in a similar fashion. These parameters are needed for the application server 52 to perform necessary computations and prepare the result page to put into HttpServletResponse 60 in the form of a string or a handle. During the performance of computations and result page preparation, the application server 52 may issue one or more queries 68 to one or more databases, the databases of suitable management systems 70, or other programs to retrieve the information necessary to prepare the result page. When the Web server 48 receives the HttpServletResponse 60 from the application server 52, the Web server 48 may parse the object, extract the result page 88, and send the page 88 to the end user 42. Note that although FIG. 2 illustrates the Web server 48, application server 52, and database management system 70 as separate blocks, it should be understood that these functions may be located in separate servers or the same server.

Embodiments of the present invention automate the construction of the URL/Query Mapping by first redirecting HttpServletRequests 58 from the Web server 48 to a wrapper (dummy) servlet 64 instead of the intended (original) servlet 66. In one embodiment, the redirection may be specified in a Web server vendor property file 50. In the example of FIG. 2, this vendor property file 50 is located in the Web server 48, although it should be understood that the vendor property file 50 may also be located in the application server 52. For example, the following statements in the Web server vendor property file 50 can redirect the HttpServletRequests 58 to CachePortalServlet (an example wrapper servlet) instead of the original servlet HouseServ (an example application related to housing) in the application server 52:

weblogic.httpd.register.HouseServ=HouseServ
weblogic.httpd.register.HouseServ=CachePortalServlet
weblogic.httpd.initArgs.HouseServ=actualServlet= HouseServCP
weblogic.httpd.register.HouseServCP=HouseServ The first line is the original statement in the vendor property file 50, which gets commented out in the present invention, and three additional statements are added. The original statement relates a particular URL request with a particular original servlet (HouseServ in this example).

The second line will redirect the URL requests for HouseServ to CachePortalServlet. After the wrapper servlet (CachePortalServlet in this example) receives the request, CachePortalServlet will extract the URL string, cookie information, and other related information and parameters, if applicable. The URL string, cookie information, and other related information and parameters can be used to identify each individual request to the Web site as well as the page sent to the users or stored in the caches. CachePortalServlet will then use the URL string, cookie information, and other parameters to assign a "job name" or "job identification" to the request. The "job identification" is not a parameter, but a system variable that is automatically passed whenever the servlet calls other programs or processes.

The third line is for syntax purposes, the declaration of a servlet to be used later.

The fourth line will forward the URL request to the original servlet HouseServ. The original servlet HouseServ will then perform its housing functions.

In another embodiment, the redirection may be implemented without modification of any application server property files by moving the original servlet to another location or renaming it, and then assigning the wrapper servlet the name of the original servlet. Continuing the previous example for purposes of illustration only, the original servlet HouseServ can be renamed HouseServ' and the wrapper servlet CachePortalServlet can be renamed HouseServ. After the wrapper servlet receives the request from the Web server, it performs the URL and cookie extraction and job name assignment tasks described above, then forwards the request to HouseServ'.

In either of the above-described embodiments, after the request is forwarded to the original servlet 66 (HouseServ or HouseServ' in the examples given above) along with the "job identification" system variable, the application server 52 may issue queries 68 to the JDBC (the database connectivity API) 76. It should be understood that the application server 52 is not limited to sending queries 68 to a single or multiple DBMSs 70. The application server 52 may also issue external calls, API calls, or http requests 72 to other file systems, DBMSs, or servers 74. Generally, it should be understood that although most of the description herein is given with reference to a DBMS 70, in embodiments of the present invention accesses 72 may be made to external data sources represented by blocks labeled "File system+ network" 74.

Although the application server 52 may issue queries 68 or requests 72 to an intended (original) JDBC 84 within a DBMS 70 or external information source 74, in embodiments of the present invention the requests or database queries may be redirected through a common database connectivity API 76 such as, but not limited to, JDBC (Java Database Connectivity), to a wrapper (dummy) JDBC 78 (if JDBC is used to connect the databases). Note that the "job identification" system variable is passed implicitly from one servlet to another. Thus, when a database query 68 is issued through the database connectivity API 76 and redirected to the wrapper JDBC 78, the API will output the query statement and its "job identification." The wrapper JDBC 78 can then recover the URL and cookie information from the "job identification" system variable, and capture a timestamp associated with the operation. The wrapper JDBC 78 also knows the query (SQL statement), because the SQL statement is one of the JDBC parameters. Therefore, a mapping 80 between URL, cookie, and database statements are automatically constructed. The mapping 80 may then be output to a file or database within, or accessible by, a content delivery server 82. The wrapper JDBC 78 will then forward the query to the original JDBC 84 so that the appropriate data can be retrieved from the databases. Note that although in the example of FIG. 2, the database connectivity API 76, wrapper JDBC 78, and original JDBC 84 are located in the DBMS 70, it should be understood that the these files and programs may also be located in the application server 52 or in the application programs of other machines.

The data retrieved from the databases may then be forwarded back to the database connectivity API 76, and then returned to the application server 52 in the form of results 86. The application server 52 may then return the results to the Web server 48 within the HttpServletResponse 60. The Web server 48 may then compile the requested Web page, and communicate the page content 88 back to the cache 44 and client browser 54.

When a data change is detected by the content delivery system, the mapping information 80 may be used to identify which Web pages stored in cache 44 may be out of date, and therefore will have to be invalidated or refreshed. The content delivery server 82 keeps track of where Web pages have been stored, and thus when it becomes necessary to refresh or invalidate a Web page, the content delivery server 82 will send an invalidate or refresh request or message 90 to the appropriate location.

Although the example embodiment described above involved a single original servlet HouseServ sending an HttpServletRequest to the application server 52, in other example embodiments, several original servlets may call each other before an HttpServletRequest is sent to the application server 52. For example, HouseServ may call AccountServ, which may then call PersonnelServ, which may then send an HttpServletRequest to the application server 52. Thus, in alternative embodiments of the present invention, the redirection scheme may be applied to every original servlet, database connectivity API, and program in the Web site. By redirecting the requests to wrapper Servlets instead of the original Servlets and attaching timestamp information, the timing and sequence of calls to the various original servlets can be monitored and determined. This information may be useful in analyzing or profiling Web site performance.

In addition, when the database connectivity API 76 receives the database query results, it may cache the query results 86 in the application server 52, and record a time stamp when the database finishes the query processing. The timestamp may be useful in analyzing or profiling Web site performance, and identifying which query results 86 should be cached in the application server 52. Subsequent HttpServletRequests 58 to the application server 52 will result in the retrieval of those cached query results 86, without a need to issue queries 68 and requests 72 to the DBMS 76 or the filesystem+network 74. Similar to the cache refreshing or invalidation scheme described above, when a data change is detected by the content delivery system, the mapping information 80 may be used to identify which results stored in the application server 52 may be out of date, and therefore will have to be invalidated or refreshed. The content delivery server 82 keeps track of where results have been stored, and thus when it becomes necessary to refresh or invalidate a stored result, the content delivery server 82 will send an invalidate or refresh request or message 90 to the appropriate location in the application server 52.

Therefore, embodiments of the present invention provide a system and method for the construction of automated and accurate URL, cookie, and database query mappings in which the users do not need to manually specify such mapping, and the existing application server programs do not need to be changed. Embodiments of the present invention also provide a system and method for the construction of URL, cookie, and database query mappings which are "plug and play" compatible in the software of the Web site architecture, and that can be used in systems in which the application server employs a multiple-threaded or multi-tasking operating system.

What is claimed is:

1. In a content delivery system comprising one or more servers for receiving a user information request destined for an original servlet in the one or more servers, a method for extracting user information request identification information from the user information request and attaching the user information request identification information to the user information request, comprising:

redirecting the user information request to a wrapper servlet, the wrapper servlet comprising statements for extracting the user information request identification information;

assigning a job identification system variable containing the user information request identification information to the redirected user information request; and forwarding the redirected user information request to the original servlet.

2. The method as recited in claim 1, the content delivery system further including a database application or other program or servlet, the method further including:

issuing at least one query to the database application or other program or servlet, the at least one query including the job identification system variable;

redirecting the at least one query to a wrapper database connectivity API instead of an original database connectivity API;

executing the wrapper database connectivity API to recover the user information request identification information from the at least one query;

constructing a user information request identification information and query mapping; and forwarding the redirected at least one query to the original database connectivity API.

3. The method as recited in claim 2, the method further including:

storing locations of cached content;

detecting changes to data associated with one or more queries; and utilizing the user information request identification information and query mapping to send refresh or invalidate commands to the locations of the cached content associated with the changed data.

4. The method as recited in claim 3, further including capturing timestamp information at any of the process steps for Web site profiling.

5. The method as recited in claim 1, the user information request comprising a URL request.

6. The method as recited in claim 1, the user information request identification information comprising URL string and cookie information.

7. In a content delivery system comprising one or more servers for receiving a user information request destined for an original servlet in the one or more servers, a method for extracting user information request identification information from the user information request and attaching the user information request identification information to the user information request, comprising:

renaming the original servlet as original servlet';

renaming a wrapper servlet as a new original servlet;

redirecting the user information request to the new original servlet;

executing the new original servlet to extract the user information request identification information from the redirected user information request, and to assign a job identification system variable containing the user information request identification information to the redirected user information request; and forwarding the redirected user information request to the original servlet'.

8. The method as recited in claim 7, the content delivery system further including a database application or other program or servlet, the method further including:

issuing at least one query to the database application or other program or servlet, the at least one query including the job identification system variable;

redirecting the at least one query to a wrapper database connectivity API instead of an original database connectivity API;

executing the wrapper database connectivity API to recover the user information request identification information from the at least one query;

constructing a user information request identification information and query mapping; and forwarding the redirected at least one query to the original database connectivity API.

9. The method as recited in claim 8, the method further including:

storing locations of cached content;

detecting changes to data associated with one or more queries; and utilizing the user information request identification information and query mapping to send refresh or invalidate commands to the locations of the cached content associated with the changed data.

10. The method as recited in claim 9, further including capturing timestamp information at any of the process steps for Web site profiling.

11. The method as recited in claim 7, the user information request comprising a URL request.

12. The method as recited in claim 7, the user information request identification information comprising URL string and cookie information.

13. In a content delivery system comprising one or more servers for receiving a user information request destined for one or more original servlets in the one or more servers, a method for profiling Web site performance, comprising:

redirecting all user information requests destined for each particular original servlet in the one or more servers to a wrapper servlet associated with that particular original servlet, the wrapper servlet comprising statements for extracting user information request identification information from each redirected user information request;

assigning timestamp information and a job identification system variable containing the user information request identification information to each redirected user information request;

forwarding each redirected user information request to its associated particular original servlet; and processing the timestamp information and the user information request identification information of each redirected URL request to generate a profile of the Web site performance.

14. The method as recited in claim 13, the user information request comprising a URL request.

15. The method as recited in claim 13, the user information request identification information comprising URL string and cookie information.

16. A content delivery system for extracting user information request identification information from a user information request and attaching the user information request identification information to the user information request, comprising:

one or more servers programmed for receiving the user information request and redirecting the user information request to a wrapper servlet instead of an original servlet, executing the wrapper servlet to extract the user information request identification information from the redirected user information request, and to assign a job identification system variable containing the user information request identification information to the redirected user information request, and forwarding the redirected user information request to the original servlet.

17. The system as recited in claim 16, further including at least one database application or other program or servlet in communication with the one or more servers, the one or more servers further programmed for:

issuing at least one query to the at least one database application or other program or servlet, the at least one query including the job identification system variable; and wherein the database application or other program or servlet is programmed for receiving the at least one query and redirecting the at least one query to a wrapper database connectivity API instead of an original database connectivity API, executing the wrapper database connectivity API to recover the user information request identification information from the at least one query, constructing a user information request identification information and query mapping, and forwarding the redirected at least one query to the original database connectivity API.

18. The system as recited in claim 17, the one or more servers further programmed for:

storing locations of cached content;

detecting changes to data associated with one or more queries; and utilizing the user information request identification information and query mapping to send refresh or invalidate commands to the locations of the cached content associated with the changed data.

19. The system as recited in claim 18, further including capturing timestamp information at any of the server programmed steps for Web site profiling.

20. The system as recited in claim 16, the user information request comprising a URL request.

21. The method as recited in claim 16, the user information request identification information comprising URL string and cookie information.

22. A content delivery system for extracting user information request identification information from a user information request and attaching the user information request identification information to the user information request, comprising:

one or more servers programmed for receiving the user information request destined for an original servlet, and renaming the original servlet as original servlet', renaming a wrapper servlet as a new original servlet, redirecting the user information request to the new original servlet, executing the new original servlet to extract the user information request identification information from the redirected user information request, and to assign a job identification system variable containing the user information request identification information to the redirected user information request, and forwarding the redirected user information request to the original servlet'.

23. The system as recited in claim 22, further including at least one database application or other program or servlet in communication with the one or more servers, the one or more servers further programmed for:

issuing at least one query to the at least one database application or other program or servlet, the at least one query including the job identification system variable; and wherein the database application or other program or servlet is programmed for receiving the at least one query and redirecting the at least one query to a wrapper database connectivity API instead of an original database connectivity API, executing the wrapper database connectivity API to recover the user information request identification information from the at least one query, and constructing a user information request identification information and query mapping.

24. The system as recited in claim 23, the one or more servers further programmed for:

storing locations of cached content;

detecting changes to data associated with one or more queries; and utilizing the user information request identification information and query mapping to send refresh or invalidate commands to the locations of the cached content associated with the changed data.

25. The system as recited in claim 24, further including capturing timestamp information at any of the server programmed steps for Web site profiling.

26. The system as recited in claim 22, the user information request comprising a URL request.

27. The system as recited in claim 22, the user information request identification information comprising URL string and cookie information.

28. A content delivery system for profiling Web site performance, comprising:

one or more servers programmed for receiving one or more user information requests destined for one or more original servlets in the one or more servers, redirecting all user information requests destined for each particular original servlet in the one or more servers to a wrapper servlet associated with that particular original servlet, the wrapper servlet comprising statements for extracting user information request identification information from each redirected user information request, assigning timestamp information and a job identification system variable containing the user information request identification information to each redirected user information request, forwarding each redirected user information request to its associated particular original servlet, and processing the timestamp information and the user information request identification information of each redirected user information request to generate a profile of the Web site performance.

29. The system as recited in claim 28, the user information request comprising a URL request.

30. The system as recited in claim 28, the user information request identification information comprising URL string and cookie information.

* * * * *